US006466774B1

(12) United States Patent
Okabe et al.

(10) Patent No.: US 6,466,774 B1
(45) Date of Patent: Oct. 15, 2002

(54) WIRELESS HANDSET

(75) Inventors: Hiroshi Okabe, Kokubunji; Ken Takei, Hachioji, both of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/663,206

(22) Filed: Sep. 18, 2000

Related U.S. Application Data

(63) Continuation of application No. 09/353,284, filed on Jul. 14, 1999, now Pat. No. 6,198,441.

(30) Foreign Application Priority Data

Jul. 21, 1998 (JP) .......................................... 10-204689

(51) Int. Cl.[7] ................................................ H04B 1/18
(52) U.S. Cl. ............................... 455/150.1; 455/193.1; 455/226.1
(58) Field of Search .......................... 455/193.1, 226.1, 455/226.2, 193.2, 193.3, 69, 150.1, 161.1, 161.2, 161.3, 179.1, 71, 277.2, 575, 280, 281, 282, 287, 289, 129, 121; 333/32; 343/860, 702

(56) References Cited

U.S. PATENT DOCUMENTS

| | | | | | |
|---|---|---|---|---|---|
| 4,031,540 | A | * | 6/1977 | Borys, Jr. | 343/860 |
| 4,682,350 | A | | 7/1987 | Akerberg | |
| 4,704,734 | A | * | 11/1987 | Menich et al. | 455/277.2 |
| 4,851,830 | A | * | 7/1989 | Andros et al. | 455/71 |
| 5,040,239 | A | * | 8/1991 | Kondo et al. | 455/193.1 |
| 5,301,358 | A | * | 4/1994 | Gaskill et al. | 455/289 |
| 5,555,448 | A | | 9/1996 | Thiede et al. | |
| 5,634,203 | A | * | 5/1997 | Ghaem | 455/134 |
| 5,634,204 | A | * | 5/1997 | Takahashi et al. | 455/134 |
| 5,636,264 | A | | 6/1997 | Sulavuori et al. | |
| 5,729,604 | A | | 3/1998 | Van Schyndel | |
| 5,970,418 | A | | 10/1999 | Budd et al. | |
| 5,991,643 | A | * | 11/1999 | Chao-Cheng | 455/575 |
| 5,995,854 | A | | 11/1999 | Wilson | |
| 6,011,960 | A | | 1/2000 | Yamada et al. | |
| 6,034,644 | A | | 3/2000 | Okabe et al. | |
| 6,054,959 | A | | 4/2000 | Amos et al. | |
| 6,073,031 | A | | 6/2000 | Heistab et al. | |
| 6,075,988 | A | * | 6/2000 | Anderson et al. | 455/161.1 |
| 6,219,532 | B1 | * | 4/2001 | Tanaka et al. | 455/575 |

* cited by examiner

*Primary Examiner*—Nay Maung
*Assistant Examiner*—Quochien B. Vuong
(74) *Attorney, Agent, or Firm*—Mattingly, Stanger & Malur, P.C.

(57) ABSTRACT

A novel wireless handset is provided which can provide control so as to tune a center frequency of impedance matching of a tunable antenna to a call frequency.

A first control signal sent from the central processing unit 51 to the synthesizer 41 or data used in the central processing unit to generate the first control signal is used to generate a second control signal by the central processing unit or the control signal generator 52 provided in the outside connected with the central processing unit, and the second control signal is applied to the control circuit 30 for center frequency of impedance matching, whereby center frequencies of impedance matching of the tunable antenna 10 are controlled.

1 Claim, 9 Drawing Sheets

| | | | | | | | |
|---|---|---|---|---|---|---|---|
| CALL CHANNEL | 1 | 2 | 3 | 4 | ... | n-1 | n |
| CALL FREQUENCY | f1 | f2 | f3 | f4 | ... | f(n-1) | fn |
| 1ST CONTROL SIGNAL | c1 | c2 | c3 | c4 | ... | c(n-1) | cn |
| 2ND CONTROL SIGNAL | t1 | t2 | t3 | t4 | ... | t(n-1) | tn |

FIG. 7

WIRELESS HANDSET

This application is a continuation of Ser. No. 09/353,284 filed on Jul. 14, 1999 now U.S. Pat. No. 6,198,441.

BACKGROUND OF THE INVENTION

1. Field of the Invention

The present invention relates to a wireless handset used in a communication system which switches a plurality of call channels for use, and more particularly to a wireless handset provided with a tunable antenna suitable for miniaturizing the wireless handset.

2. Description of the Related Art

There is a demand for more compact, thin wireless handsets from the viewpoint of improvement of portability. Although an antenna used in a wireless handset must have sensitivity throughout a frequency band of a system in which the handset is used, since self bandwidth decreases as the volume occupied by an antenna decreases, an attempt to miniaturize an antenna while maintaining bandwidth in an identical frequency band has been difficult.

SUMMARY OF THE INVENTION

Generally, the band of frequencies used for calls between a specific base station and terminal equipment is much smaller than an entire frequency band of a system. Accordingly, for each call, by adaptively changing a center frequency of impedance matching of an antenna to a frequency used for the call, a frequency band that the antenna should have can be decreased and the volume of the antenna can be reduced. As such an antenna, there is suggested by U.S. Pat. No. 6,034,644 a coaxial resonant slot antenna which supplies RF power to a strip conductor disposed within a conductive flat cubic with a slot provided on the top thereof and insulation from the conductive flat cubic, wherein the coaxial resonant slot antenna is a tunable slot antenna in which at least one island conductor is provided within the slot and center frequencies of impedance matching of the antenna can be changed in a wide range by changing capacitance values between the island conductor and the wall face of the conductive flat cubic.

If a center frequency of impedance matching of a tunable antenna such as said tunable slot antenna can be controlled so as to tune to a frequency used for a call, an antenna having a much smaller call band than an entire frequency band requested by the system could be used in a wireless handset, the volume occupied by the antenna could be reduced, and the wireless handset could be miniaturized.

An object of the present invention is to provide a novel wireless handset that can be provided with a compact antenna with a narrow bandwidth by making it possible to provide control so as to tune a center frequency of impedance matching of a tunable antenna to a frequency used for a call.

The above described problem of the present invention can be effectively solved by providing a wireless handset with a built-in tunable antenna, comprising a built-in antenna provided within a case of the wireless handset, an RF circuit part connected to the built-in antenna, a logic circuits part connected to the RF circuit part, and a frequency synthesizer connected between the logic circuits part and said RF circuit, which generates a local oscillation frequency signal in said frequency synthesizer in accordance with a first control signal from a central processing unit contained in said logic circuits part and performs sending/receiving operations with a frequency determined by said local oscillation frequency signal in said RF circuit, wherein said built-in antenna is a tunable antenna including a control circuit for center frequency of impedance matching and a control signal generator is provided within said central processing unit or in the outside connected to the central processing unit and is connected to said control circuit for center frequency of impedance matching, and wherein the control signal generator generates a second control signal from said first control signal sent to said frequency synthesizer or data used in said central processing unit to generate the first control signal, and controls a center frequency of impedance matching of said tunable antenna by applying said second control signal to said control circuit for center frequency of impedance matching.

If such means are adopted, since the first control signal or data used in the central processing unit to generate the first control signal has call frequency information determined by the central processing unit, a center frequency of impedance matching of a tunable antenna can be tuned to a call frequency using the call frequency information.

In a wireless handset, comprising a receive-only built-in antenna, an outer antenna for sending and receiving, an RF signal switching circuit connected between said built-in antenna and said outer antenna, an RF circuit part connected to said RF signal switching circuit, a logic circuits part connected to said RF circuit part, a frequency synthesizer connected between said logical circuit and said RF circuit, and a received signal strength detector provided within said RF circuit or in the outside connected thereto and connected to said logic circuits part, which generates a local oscillation frequency signal in said frequency synthesizer in accordance with a first control signal from a central processing unit contained in said logic circuits part, performs sending/receiving operations with a frequency determined by said local oscillation frequency signal in said RF circuit, and performs diversity receiving wherein an antenna with which higher received signal strength is detected in said received signal strength detector is used for receiving when an antenna connected with said RF circuit by said RF signal switching circuit is said built-in antenna or said outer antenna, wherein said built-in antenna is a tunable antenna including a control circuit for center frequency of impedance matching and a control signal generator is provided within said central processing unit or in the outside connected to the central processing unit and is connected to said control circuit for center frequency of impedance matching, if the control signal generator generates a second control signal from said first control signal sent to said frequency synthesizer or data used in said central processing unit to generate the first control signal and controls a center frequency of impedance matching of said tunable antenna by applying said second control signal to said control circuit for center frequency of impedance matching, since a center frequency of impedance matching of a tunable antenna can be tuned to a call frequency using the call frequency information using the first control signal containing the call frequency information or data used in the central processing unit to generate the first control signal, a compact tunable antenna with a narrow bandwidth could be used as a built-in antenna.

Since a miniaturized built-in antenna allows a larger distance between it and an outer antenna, the amount of electromagnetic coupling between an outer antenna and an internal antenna can be reduced, reduction of gain of both antennas can be avoided, and diversity receiving effects can be improved as a result of a reduced correlation between both antennas.

By constructing a tunable antenna used in a wireless handset according to the present invention so that it is a tunable slot antenna comprising a conductive flat cubic which is cuboid as a whole, a slim strip conductor disposed along with the direction of the resonant axis of internal space of the conductive flat cubic and in insulation from the conductive flat cubic, a slot for sending and receiving radio waves, formed across the strip conductor on the top of the conductive flat cubic, and a slip island conductor disposed in insulation from the conductive flat cubic within the slot, wherein RF power is supplied between a coupling part set in said strip conductor and the wall face of said conductive flat cubic, and wherein a variable capacitance circuit connected between said island conductor and the wall face of said conductive flat cubic is provided as said control circuit for center frequency of impedance matching, since the antenna has single-side directivity, parts can be installed on the circuit board whose face is opposite to a face on which the slot of the antenna is formed, and the packaging density can be increased, so that a wireless handset can be made more compact.

BRIEF DESCRIPTION OF THE DRAWINGS

FIG. 7 is a table indicating a relationship between first and second control signals.

DESCRIPTION OF THE PREFERRED EMBODIMENTS

Figure 1:
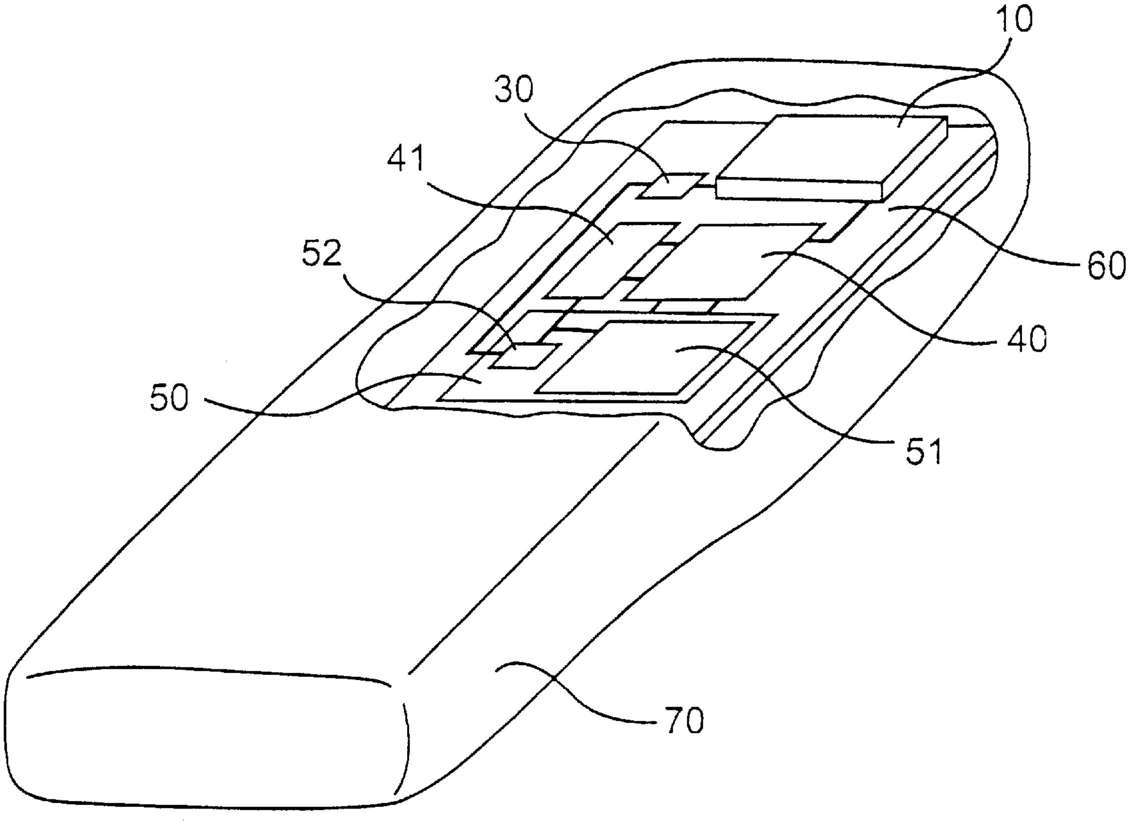
FIG. 1 is a perspective view of circuits and a circuit board for explaining a first embodiment of a wireless handset with a built-in tunable antenna.

Numerals in the drawings mean as follows.

10: Tunable antenna
11: Conductive flat cubic
12: Stripline
13: Slot
14: Conductor in a slot
15: Power supply point
16: Test port
20: Helical antenna
21: Monopole antenna
22: Power supply port
30: Control circuit for center frequency of impedance matching
31: Variable capacitance circuit
32: Variable capacitance diode
33: Resistor
34: Inductor
35: Capacitor
40: RF circuit
41: Frequency synthesizer
42: RF switch
43: Received signal strength detector
50: Logic circuits part
51: Central processing unit
52: Control signal generator
53: Frequency to voltage conversion table
54: Digital to analog converter
55: Arithmetic and logic circuits part
60: Circuit board
70: Case of wireless handset
80: Equivalent circuit of a tunable antenna Hereinafter, with reference to several embodiments shown in the drawings, embodiments of a wireless handset according to the present invention will be described in more detail. Identical reference numerals in FIGS. 1 to 5 designate identical or similar objects.

Embodiment 1

FIG. 1 shows a perspective view of circuits and a circuit board of a wireless handset with a built-in tunable antenna which includes a tunable antenna, an RF circuit, and a logic circuits part on an identical circuit board. In FIG. 1, the reference numerals 10, 30, 40, 41, 51, 52, and 60 designate a tunable antenna, a control circuit for center frequency of impedance matching of the tunable antenna, an RF circuit, a frequency synthesizer, a central processing unit provided in a logic circuits part 50, a control signal generator, and a circuit board, respectively.

The RF circuit 40 is connected with the tunable antenna 10, the logic circuits part 50, and the frequency synthesizer 41. Furthermore, the frequency synthesizer is connected with the central processing unit 51. A send signal is generated in the logic circuits part and is sent to the RF circuit, and is sent from the antenna after being subjected to frequency conversion using a local oscillation frequency signal generated by the frequency synthesizer within the RF circuit. Reversely, a receive signal, after being received in the antenna, is sent to the RF circuit and, after being subjected to frequency conversion using a local oscillation frequency signal generated by the frequency synthesizer within the RF circuit, is sent to the logic circuits part.

A center frequency of impedance matching of the tunable antenna 10 is controlled by connecting the control circuit 30 for center frequency of impedance matching to the tunable antenna and applying a second control signal from a control signal generator 52 to the control circuit for center frequency of impedance matching. The control signal generator can be provided in the outside connected to the central processing unit or within the central processing unit, as shown in FIG. 1.

Generally, terminals used in a communication system which switches a plurality of call channels for use tune the frequency of a send or receive signal sent to or received from an antenna to the frequency of a call channel by changing the frequency of a local oscillation frequency signal generated by a frequency synthesizer in accordance with a first control signal from a central processing unit. Accordingly, the first control signal or data used in the central processing unit to generate the first control signal contains call frequency information determined by the central processing unit, and by using them to generate a second control signal from a control signal generator, a center frequency of impedance matching of the tunable antenna can be tuned to the call frequency.

Second control signals can be generated from the control signal generator by a method described below. For example, as shown in FIG. 7, when call frequencies are fixed as f1 to fn for call channel numbers 1 to n, let first control signals for setting the call frequencies be c1 to cn. Similarly, let second control signals to be applied to the control circuit 30 for center frequency of impedance matching to tune a center frequency of impedance matching of a tunable antenna to f1 to fn be t1 to tn, respectively. There is a one-to-one relationship between c1 to cn and t1 to tn. Accordingly, by retaining a table indicating the relationship between the first control signals and second control signals in the lower half of FIG. 7 in the control signal generator, when the first control signals are input to the control signal generator, the generator can generate the second control signals by referring to the table. If the relationship between the first control signals and second control signals can be found by a simple operation, the control signal generator, by retaining an expression instead of holding the relationship between both, might generate a second control signal by an operation when a first control signal is input.

Figure 9:
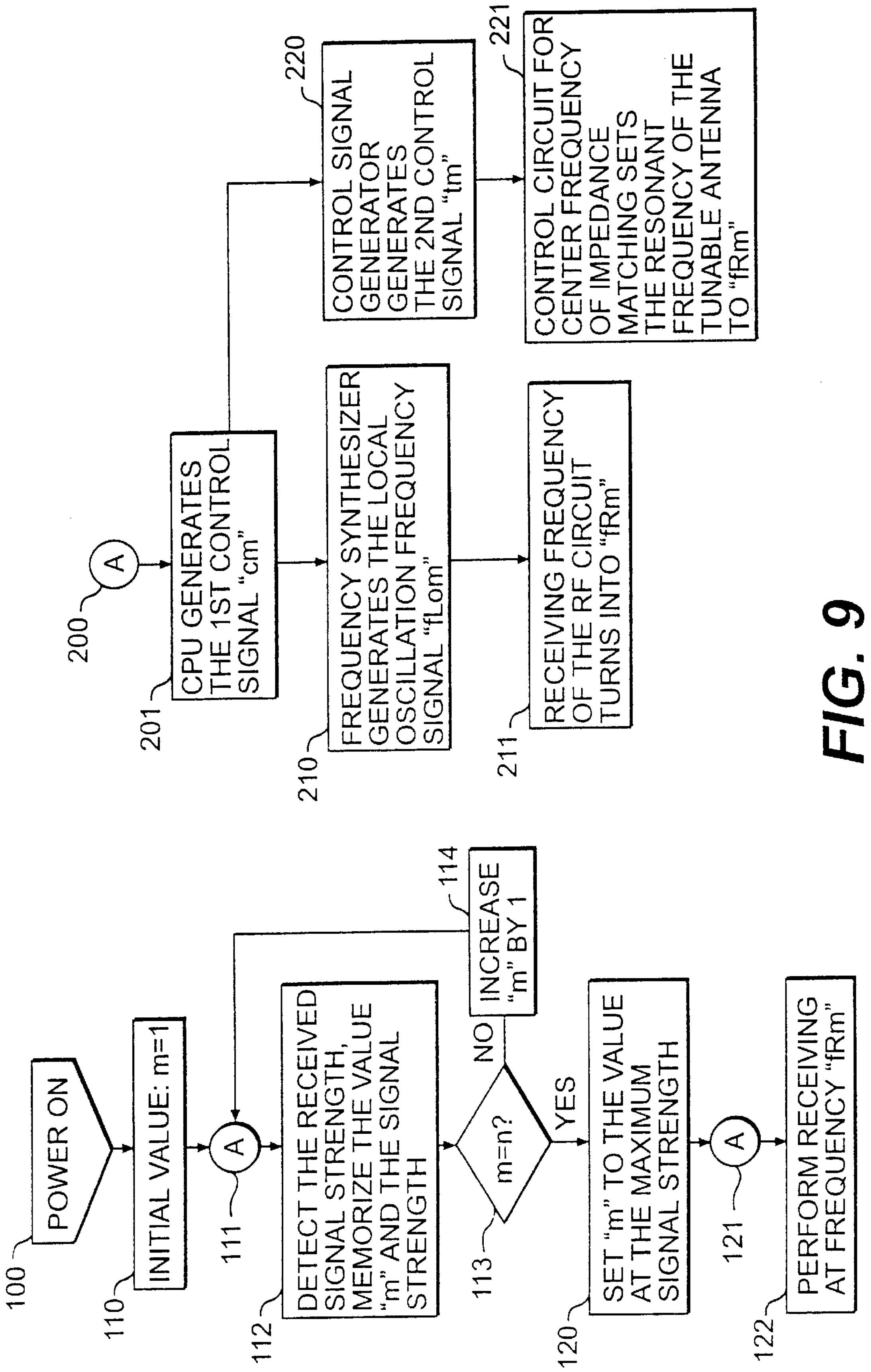
FIG. 9 is a flowchart for explaining the operation of a wireless handset according to the present invention.

To start a call using the tunable antenna, a center frequency of impedance matching of the tunable antenna must be tuned to a frequency with which to start the call. To do this, for example, control is performed as shown by the flowchart of FIG. 9. When power is applied to a terminal (step 100), a central control circuit initializes a channel number m to 1 (step 110). Thereafter, in step 111, the RF circuit and a center frequencie of impedance matching of the tunable antenna are set to a receive frequency fRm of channel m. Frequency setting will be described in detail in and after step 200. If the RF circuit and a center frequencies of impedance matching of the tunable antenna are set to fRm, signals of frequency fRm can be received in the RF circuit via the tunable antenna, and the central processing unit retains the channel number m at receive and a received signal strength obtained in the received signal strength detector connected to the RF circuit (step 112). It is determined in step 113 whether the channel number is the last channel number n, and if not so, the value m is incremented by 1 in step 114, and steps 111 to 113 are repeated. If the value m reaches a value n in step 113, control proceeds to the next step 120, where a channel number indicating the maximum signal strength, determined from the relationship between retained channel numbers and received signal strengths, is set to the value m. Thereafter, in step 121, as in step 111, the RF circuit and a center frequencie of impedance matching of the tunable antenna are set to a receive frequency fRm of channel m. These operations enable a receive operation to be performed with the frequency fRm (step 122). Since there is generally a one-to-one relationship between receive frequencies (receive channels) and send frequencies (send channels), determining a receive frequency determines a send frequency, enabling send-receive operations.

In and after step 200, the setting of the RF circuit and a center frequencie of impedance matching of the tunable antenna to a receive frequency fRm of channel m is performed as described below. In accordance with a specified channel number (a value m), the central processing unit generates a first control signal cm (step 201). When the first control signal is sent to the frequency synthesizer, the frequency synthesizer generates a local oscillation frequency signal fLOm (step 210). Upon receipt of the local oscillation frequency signal fLOm, the RF circuit becomes ready to receive a signal of frequency fRm (step 211). On the other hand, when the first control signal cm is input to the control signal generator, the control signal generator, to tune center frequencies of impedance matching of the tunable antenna to f1 to fn, for example, as described previously, generates a second control signal tm to be afforded to the control circuit for center frequency of impedance matching to tune a center frequency of impedance matching of the tunable antenna to a frequency fRm of channel number m by referring to a table indicating a relationship between t1 to tn and c1 to cn, the t1 to tn being second control signals to be afforded to the control circuit for center frequency of impedance matching (step 220). By a second control signal tm being input, the control circuit for center frequency of impedance matching can set a center frequency of impedance matching (resonance frequency) of the tunable antenna to fRm (step 221).

The control circuit for center frequency of impedance matching, which changes the impedance matching state of an antenna, can be embodied by active elements such as RF switches and diodes, or a combination of these active elements and passive elements such as inductors and capacitors.

According to the present invention, a first control signal containing call frequency information or data used in a central processing unit to generate the first control signal is used to generate a second control signal in a control signal generator, whereby a center frequency of impedance matching of a tunable antenna can be tuned to a call frequency without having to newly provide a circuit for specifying call frequency information, so that an antenna installed in a wireless handset can be miniaturized so that it has much smaller band, necessary for calls, than an entire call band requested by the system, and thereby a compact wireless handset can be embodied.

Second Embodiment

Figure 2:
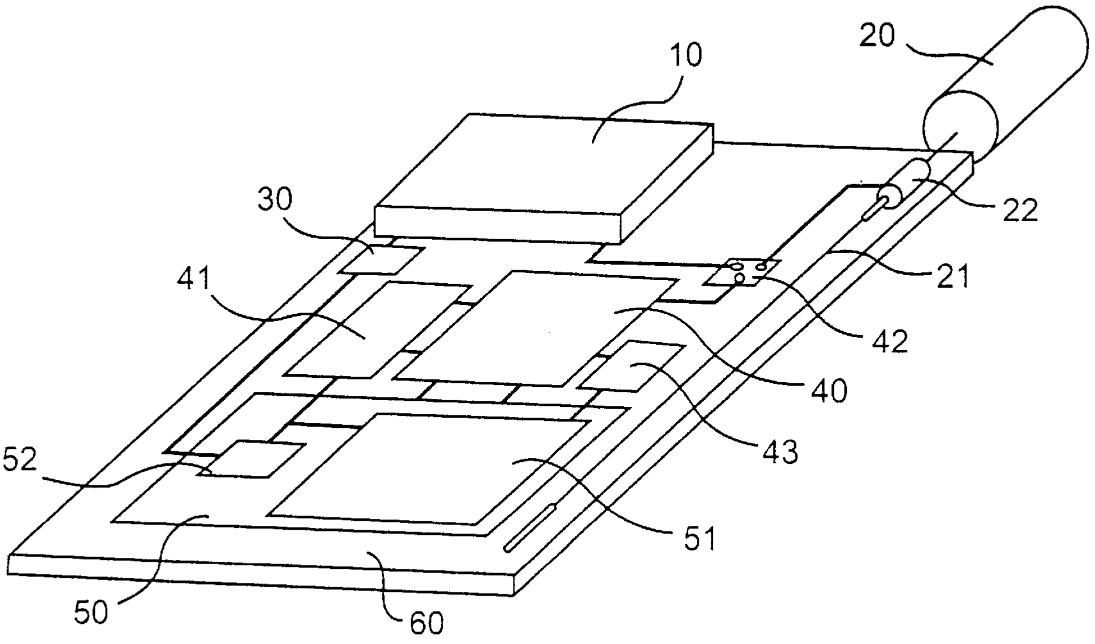
FIG. 2 is a perspective view of circuits and a circuit board for explaining a second embodiment of the present invention.

FIG. 2 show a perspective view of circuits and a circuit board for explaining a second embodiment of the present invention. On a circuit board 60 are placed, in addition to the circuits described in the first embodiment of FIG. 1, an outer antenna comprising a helical antenna 20 and a monopole antenna 21, a power supply port 22 of the outer antenna, an RF switch 42 functioning as an RF signal switching circuit, and a received signal strength detector 43 connected to an RF circuit 40 and a central processing unit 51.

A tunable antenna 10 is used as a receive-only antenna and is connected to the RF circuit via the RF switch. The outer antenna is used as a send/receive antenna; when the monopole antenna is housed within the wireless handset case, the helical antenna operates connected to the power supply port, and when the monopole antenna is pulled out, the monopole antenna is connected to the power supply port instead of the helical antenna. The power supply port of the outer antenna and the RF circuit are connected via the RF switch.

With this construction, the RF switch switches antennas to be used so that the respective received signal strengths are detected by the received signal strength detector, whereby diversity receiving—an antenna via which higher received signal strength is detected is used for receiving—can be performed. The diversity receiving method, which provides a solution to the fading phenomenon which make the problem that the strength of receive power changes with time when a wireless handset is used under a traveling situation, is adopted in many wireless handsets.

According to the present invention, in a wireless handset to perform diversity receiving, as in the first embodiment, a first control signal containing call frequency information or data used in a central processing unit to generate the first control signal is used to generate a second control signal in a control signal generator, whereby a center frequency of impedance matching of a tunable antenna can be tuned to a call frequency, so that an antenna installed in a wireless handset can be miniaturized so that it has much smaller band, necessary for calls, than an entire call band requested by the system, and thereby a compact wireless handset can be embodied. Furthermore, according to the present invention, since a compact tunable antenna with a narrow bandwidth can be used as a built-in antenna, the distance between the built-in antenna and the outer antenna can be extended, so that a reduced electromagnetic coupling amount between the outer antenna and the built-in antenna helps to prevent the gain of both antennas from decreasing and reduced correlation between both antennas helps to offer improved diversity receiving effects.

When a call is started using a wireless handset according to the present invention, after the call is received by the outer antenna while the central processing unit changes the frequency of a local oscillation frequency signal generated by the frequency synthesizer to change a received frequency of the RF circuit, a first control signal for defining, as a call receive frequency, a frequency with the highest received signal strength detected in the received signal strength detector is sent from the central processing unit to the frequency synthesizer, a second control signal is generated in the control signal generator from the first control signal or data used in the central processing unit to generate the first control signal, and the second control signal is input to the control circuit for center frequency of impedance matching so as to tune a center frequency of impedance matching of the tunable antenna to the call receive frequency, whereby the control signal generator and the control circuit for center frequency of impedance matching need not be activated for the duration that the maximum received signal strength signal is detected to determine a call receive frequency, so that control of the tunable antenna can be simplified.

Third Embodiment

Figure 3:
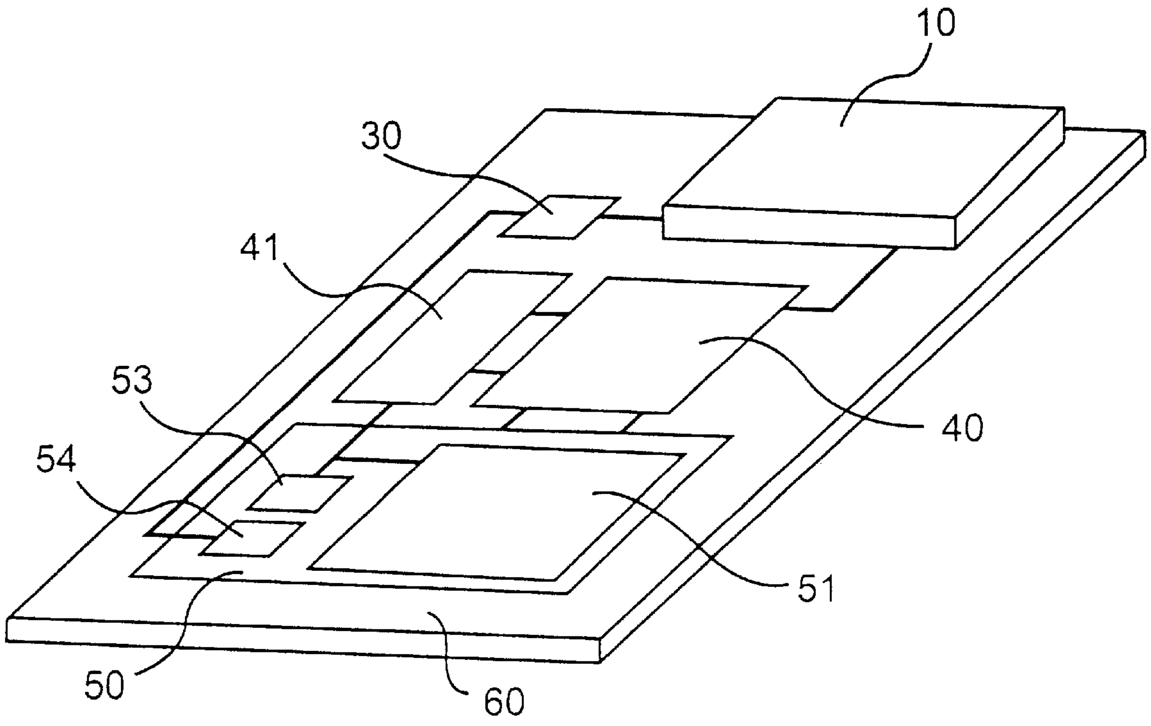
FIG. 3 is a perspective view of circuits and a circuit board for explaining a third embodiment of the present invention.

FIG. 3 shows a perspective view of circuits and a circuit board for explaining a third embodiment of the present invention. A control circuit 30 for center frequency of impedance matching is a circuit that changes a center frequency of impedance matching of a tunable antenna 10 in accordance with a DC voltage value of a control signal input to the circuit. A control signal generator comprises a frequency to voltage conversion table 53 and a digital to analog converter 54 connected to the frequency to voltage conversion table.

When a central processing unit 51 sends a first control signal to a frequency synthesizer 41 to determine a send/receive frequency of an RF circuit 40, the first control signal or data used in the central processing unit to generate the first control signal is sent to the frequency to voltage conversion table. When the first control signal or data used in the central processing unit to generate the first control signal is input, the frequency to voltage conversion table generates a digital signal in accordance with a relationship among input and output signals retained so that a second control signal having a DC voltage value which enables a center frequency of impedance matching of the tunable antenna 10 to tune to a call frequency determined by the first control signal is generated from the digital to analog conversion circuit. The digital to analog converter generates a DC voltage in accordance with a digital signal output by the frequency to voltage conversion table. Since the DC voltage is applied to the control circuit for center frequency of impedance matching as a second control signal having a DC voltage value that enables a center frequency of impedance matching of the tunable antenna to tune to a call frequency determined by the first control signal, control is performed by the control circuit for center frequency of impedance matching so that a center frequency of impedance matching of the tunable antenna tunes to a call frequency determined by the first control signal.

According to the present invention, since the process of generating a second control signal in the control signal generator can be completed by two processes, the generation of a specific digital signal for a specific input signal and the generation of a specific DC voltage for a specific digital signal, complicated operation processes are not required. Therefore, time required to generate a second control signal can be reduced, and furthermore, since the frequency to voltage conversion table can be embodied by a storage unit such as semiconductor memory and the digital to analog converter by a general D/A converter, the control signal generator can be inexpensively formed using common circuits.

If a storage unit capable of rewriting internal data is adopted as the frequency to voltage conversion table, a specific receive frequency signal is received while changing a DC voltage value of a second control signal applied to the control circuit for center frequency of impedance matching, and the frequency to voltage conversion table can be reset so that the DC voltage value of a second control signal with which the highest received signal strength is obtained in the RF circuit is made to correspond with the frequency of the specific receive frequency signal. Although it is general that when the characteristics of an tunable antenna and a control circuit for center frequency of impedance matching are dispersed, the editing of adjustment patterns and modifications of circuit constants are required, according to this embodiment, the dispersion could be accommodated by resetting the frequency to voltage conversion table and a cut of the adjustment process would help to reduce assembly costs.

Fourth embodiment

Figure 4:
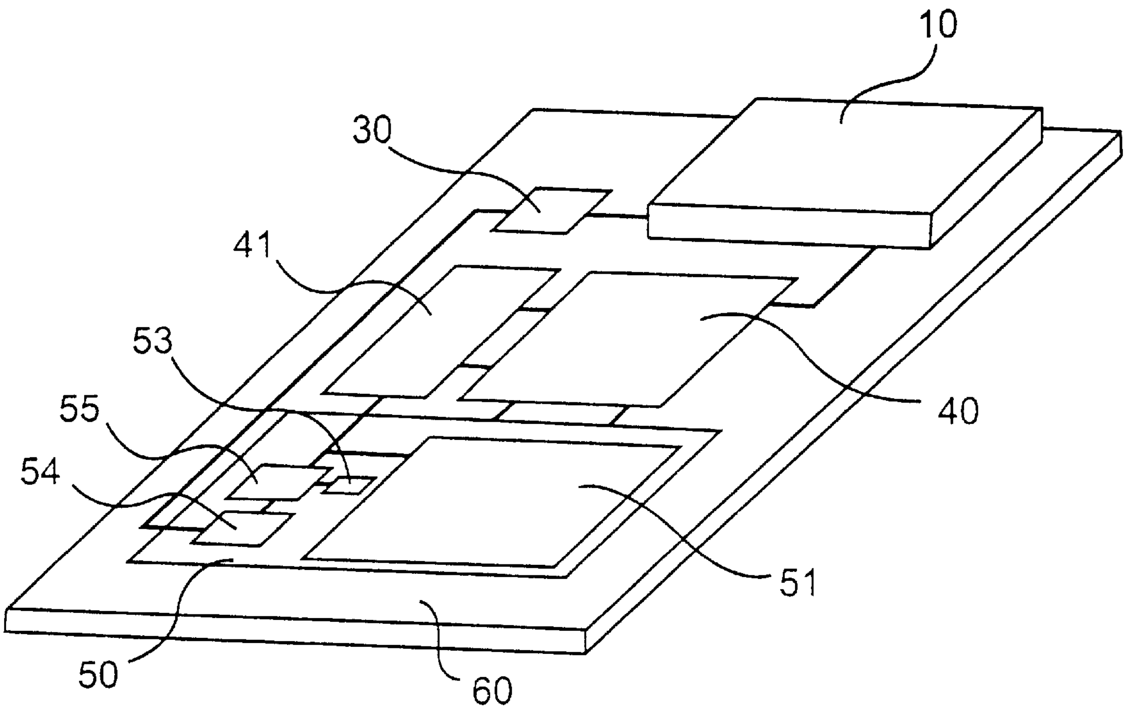
FIG. 4 is a perspective view of circuits and a circuit board for explaining a fourth embodiment of the present invention.

FIG. 4 shows a perspective view of circuits and a circuit board for explaining a fourth embodiment of the present invention. A control circuit 30 for center frequency of impedance matching changes a center frequency of impedance matching of a tunable antenna 10 in accordance with a DC voltage value of a control signal input to the circuit. A control signal generator comprises an arithmetic and logic circuits part 55, a frequency to voltage conversion table 53, and a digital to analog converter 54.

When a central processing unit 51 sends a first control signal to a frequency synthesizer 41 to determine a send/receive frequency of an RF circuit 40, the first control signal or data used in the central processing unit to generate the first control signal is sent to the arithmetic and logic circuits part. The frequency to voltage conversion table retains several relationships between a first control signal input to the arithmetic and logic circuits part or data used in the central processing unit to generate the first control signal, and digital signals to be output from the arithmetic and logic circuits part so as to generate from the digital to analog converter a second control signal having a DC voltage value which enables a center frequency of impedance matching of the tunable antenna 10 to tune to a call frequency determined by the first control signal. When a first control signal input to the arithmetic and logic circuits part or data used in the central processing unit to generate the first control signal is input to the arithmetic and logic circuits part, the arithmetic and logic circuits part refers to the relationships between input and output signals, retained in the frequency to voltage table, compensates data related to input and output signals by approximate computations, and generates digital signals. The digital to analog converter generates a DC voltage in accordance with a digital signal output by the arithmetic and logic circuits part. Since the DC voltage is applied to the control circuit for center frequency of impedance matching as a second control signal having a DC voltage value that enables a center frequency of impedance matching of the tunable antenna to tune to a call frequency determined by the first control signal, control is performed by the control circuit for center frequency of impedance matching so that a center frequency of impedance matching of the tunable antenna tunes to a call frequency determined by the first control signal.

In order that the arithmetic and logic circuits part generates output signals for inputs corresponding to input/output signal relationships not retained in the frequency to voltage conversion table, for example, when a center frequency of impedance matching of a tunable antenna is proportional to a DC voltage value of a second control signal input to the control circuit for center frequency of impedance matching, two first control signals or two pieces of data used in the central processing unit to generate the first control signals having frequency information corresponding to two different call channels of call frequencies, and two digital signals to be input to the digital to analog converter to generate DC voltage values of a second control signal that tune center frequencies of impedance matching of the tunable antenna to frequencies corresponding to the two call channels are retained in the frequency to voltage conversion table, whereby a frequency change to unit voltage, determined by a potential difference of DC voltages generated in the digital to analog converter from the former two frequency intervals and the latter two, and a frequency and a DC voltage value corresponding to one of the call channels can be used to linearly and approximately compute a DC voltage value required for a certain frequency, so that a required DC voltage value could be found by performing the above linear, approximate computation for a frequency determined by a signal input to the arithmetic and logic circuits part and a digital signal for generating the DC voltage value in the digital to analog converter could be output. When a center frequency of impedance matching of a tunable antenna is not proportional to a DC voltage value of a second control signal input to the control circuit for center frequency of impedance matching, by retaining the relationship among input and output signals in the frequency to voltage conversion table for each section in which the relationship between center frequencies of impedance matching and DC voltages of second control signals appears almost proportional, a linear, approximate computation can be performed for each section. When a center frequency of impedance matching of a tunable antenna is not proportional to a DC voltage value of a second control signal input to the control circuit for center frequency of impedance matching, polynomial equation approximation might be used as an approximate computation method, in which case the number of pieces of data the input/output signal relationships to be retained in the frequency to voltage conversion table can be reduced, compared to the linear approximation by section.

According to this embodiment, as described previously, since data related to input and output signals can be compensated by approximate computations by the arithmetic and logic circuits part from several pieces of data of input/output signal relationships retained in the frequency to voltage conversion table, in order that the arithmetic and logic circuits part, in response to an input signal, outputs a signal that causes the tunable antenna to be tuned to a call frequency, the frequency to voltage conversion table need not retain input/output signal relationships corresponding to all call channels, so that a more inexpensive circuit with a smaller storage capacity can be used as the frequency to voltage conversion table, compared to the wireless handset according to the fourth embodiment, and the process of retaining required input/output signal relationships in the frequency to voltage conversion table can be simplified, and thereby the cost of fabricating a wireless handset can be reduced.

Fifth Embodiment

Figure 5:
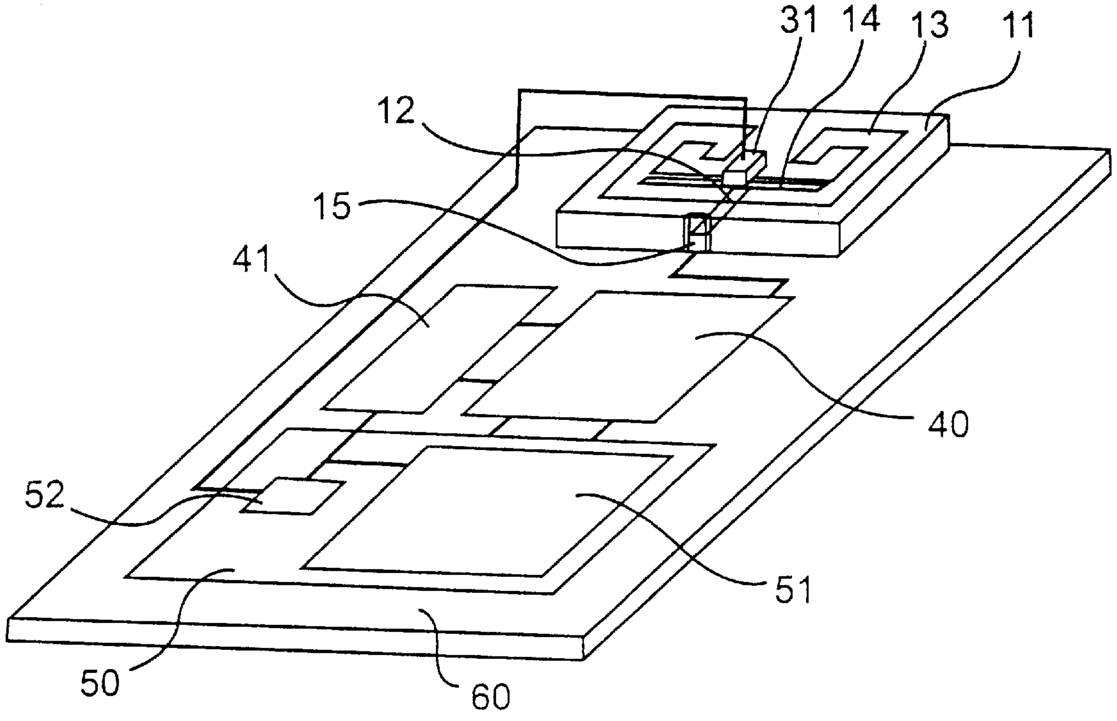
FIG. 5 is a perspective view of circuits and a circuit board for explaining a fifth embodiment of the present invention.

FIG. 5 shows a perspective view of circuits and a circuit board for explaining a fifth embodiment of the present invention. A tunable antenna installed in an RF circuit 60 is a tunable slot antenna, which comprises a conductive flat cubic 11 which is cuboid as a whole, a slim strip conductor 12 disposed along with the direction of the resonant axis of internal space of the conductive flat cubic and in insulation from the conductive flat cubic, a slot 13 formed across the strip conductor on the top of the conductive flat cubic, and a slip island conductor 14 disposed in insulation from the conductive flat cubic within the slot. RF power from an RF circuit 40 to the tunable slot antenna is supplied between a coupling part 15 set in the strip conductor and the wall face of the conductive flat cubic, and radio waves are sent and received to and from the slot electromagnetically coupled with the strip conductor. A variable capacitance circuit 31, which is a control circuit for center frequency of impedance matching, is connected between the island conductor and the wall face of the conductive flat cubic. The tunable slot antenna has the characteristic of being capable of widely changing center frequencies of impedance matching by changing the capacitance values between the island conductor and the wall face of the conductive flat cubic.

According to this embodiment, by using a tunable slot antenna having single-side directivity, parts can be installed on the circuit board whose face is opposite to a face on which the slot of the antenna is formed, and the packaging density can be increased, so that a wireless handset can be made more compact.

Sixth Embodiment

Figure 6:
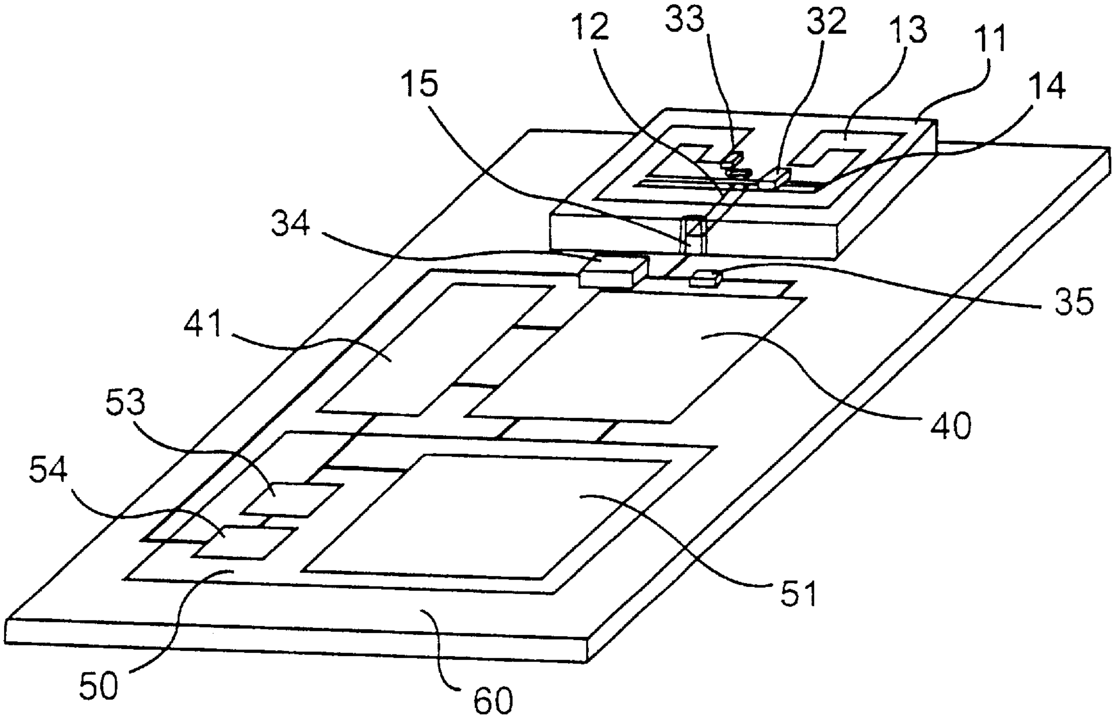
FIG. 6 is a perspective view of circuits and a circuit board for explaining a sixth embodiment of the present invention.
Figure 8:
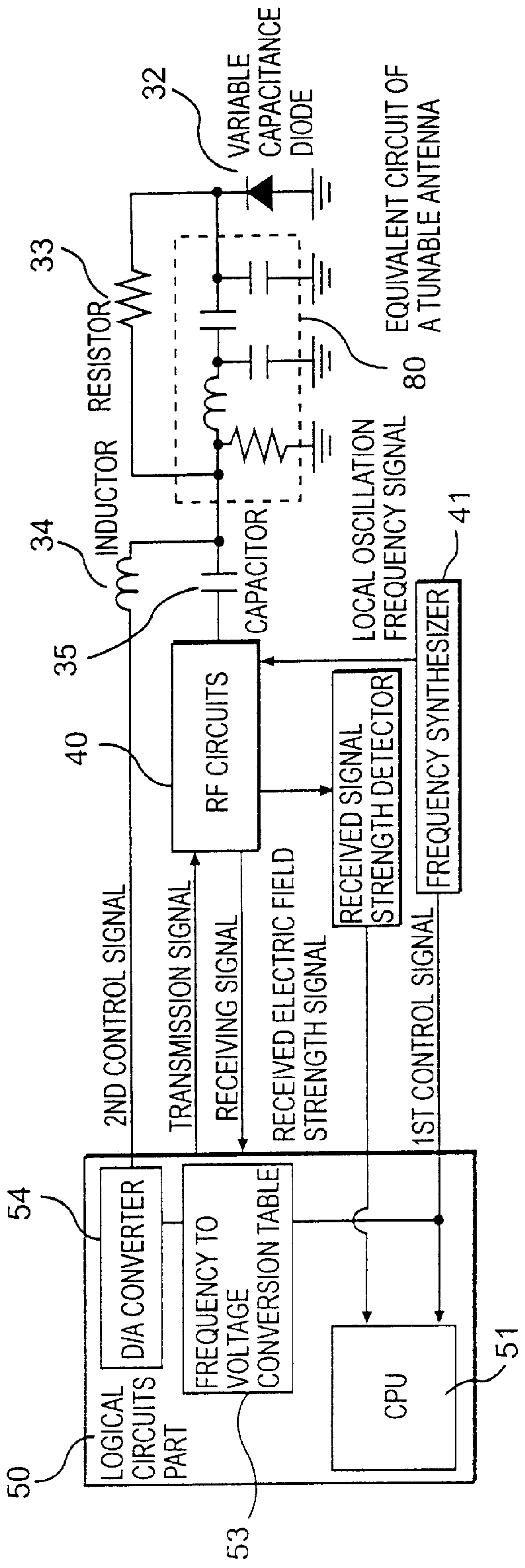
FIG. 8 is a detailed diagram of circuits of a wireless handset according to the present invention.

FIG. 6 shows a perspective view of circuits and a circuit board for explaining a sixth embodiment of the present invention. On a tunable slot antenna are mounted, instead of the variable capacitance circuit in the fifth embodiment, a variable capacitance diode 32 connected between an island conductor 14 and the wall face of a conductive flat cubic 11, and a resistor 33 connected between the island conductor and the end of the strip conductor 12 that is far from a coupling part thereof. A second control signal, which is a DC voltage generated by a digital to analog converter 54 constituting a control signal generator, is applied to the coupling part 15 via an inductor 34, and RF signals are exchanged between an RF circuit 40 and the coupling part of the antenna via a capacitor 35.

If the resistor has a sufficiently higher resistance value than RF impedance that the strip conductor has for the conductive flat cubic, the resistor 33 can be handled as a first element for blocking RF power which prevents an RF signal fed from the coupling part 15 from leaking from the strip conductor to the island conductor via the resistor 33. If the value of the resistor 33 is set sufficiently lower than DC resistance of the variable capacitance diode, a DC voltage applied to the coupling port can be effectively applied to the variable capacitance diode via the strip conductor, resistor 33, and island conductor. Since RF impedance that the strip conductor has for the conductive flat cubic is several ohms to hundreds of ohms and DC resistance of the variable capacitance diode is generally in the order of 10 MΩ, If the resistor 33 has a resistance value of tens to hundreds of kiloohms, the above conditions both are satisfied. By doing so, the coupling part 15 can be handled as a feeding point for RF signals to the antenna and as a feeding point for DC voltage applied to the variable capacitance diode.

Although a second control signal generated by the digital to analog converter is DC voltage having a certain voltage value, and is applied to the coupling part via an inductor, which is a second element for blocking RF power, it is not applied to the RF circuit since a capacitor, which is an element for blocking DC power, exists. Although RF signals are exchanged between the RF circuit and the coupling part of the antenna via the capacitor, which is an element for blocking DC power, they do not leak to the digital to analog converter since the inductor, which is an second element for blocking RF power, exists.

According to this embodiment, since the control circuit for center frequency of impedance matching can be configured with two inexpensive elements, that is, a variable capacitance diode that can change capacity values between the island conductor and the wall face of the conductive flat cubic upon application of direct current, and a resistor, which is an first element for blocking RF power, the control circuit for center frequency of impedance matching can be fabricated compactly and inexpensively. Furthermore, since a point at which an RF signal is fed to the antenna and a point at which a second control signal is fed to the control circuit for center frequency of impedance matching are aligned at the coupling part of the antenna, input/output signal lines to be connected to the antenna can be integrated to one, so that layouts can be made more freely in comparison with the case where a plurality of input/output signal lines are provided, contributing to further improving the packaging density on the board and making a wireless handset more compact.

According to the present invention, since a center frequency of impedance matching of a tunable antenna can be tuned to a call frequency used by a wireless handset, a compact tunable antenna with a narrow bandwidth which covers much smaller band, necessary for calls, than an entire call band requested by the system in which the wireless handset is used can be installed in the wireless handset, and a compact wireless handset can be embodied.

Also, according to the present invention, in a wireless handset that performs diversity receiving by a receive-only built-in antenna and a sending/receiving outer antenna, since the distance between the built-in and outer antennas can be extended by using a compact tunable antenna as the built-in antenna, a wireless handset with high sensitivity can be embodied.

Furthermore, according to the present invention, since a tunable slot antenna having single-side directivity can be used, parts can be installed on a face which is opposite to a face on which the slot of the antenna is formed, and the packaging density can be increased, so that a wireless handset can be made more compact.

What is claimed is:

1. A wireless handset used in a communication system that switches a plurality of call frequencies for use, comprising: a tunable antenna having a circuit for center frequency of impedance matching; a strength detector for retaining received signal strength for each call frequency; a circuit that refers to a frequency to voltage conversion table retaining a relationship between a digital signal for controlling a DC voltage value for setting a center frequency of impedance matching of said tunable antenna and each call frequency, to output a digital signal corresponding to information about a call frequency indicating an input maximum received signal strength; and a digital to analog converter for generating a DC voltage for setting a center frequency of impedance matching of the tunable antenna in accordance with said digital signal, wherein control is performed by said DC voltage so that a center frequency of impedance matching of the tunable antenna tunes to a call frequency.

* * * * *